(12) United States Patent
Roche et al.

(10) Patent No.: US 11,435,927 B2
(45) Date of Patent: Sep. 6, 2022

(54) PROTECTED SAVESET VOLUME MOVEMENT VIA METADATA BOOTSTRAP

(71) Applicant: EMC IP Holding Company LLC, Hopkinton, MA (US)

(72) Inventors: Michael Roche, Hamilton (CA); Ashish Goyal, Bangalore (IN); Scott Quesnelle, Burlington (CA); Kiran Kumar Malle Gowda, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 32 days.

(21) Appl. No.: 17/084,876

(22) Filed: Oct. 30, 2020

(65) Prior Publication Data

US 2022/0137847 A1 May 5, 2022

(51) Int. Cl.
| | |
|---|---|
| *G06F 3/06* | (2006.01) |
| *G06F 9/44* | (2018.01) |
| *G06F 16/48* | (2019.01) |
| *G06F 16/43* | (2019.01) |
| *G06F 16/41* | (2019.01) |
| *G06F 9/4401* | (2018.01) |
| *G06F 16/435* | (2019.01) |

(52) U.S. Cl.
CPC .......... *G06F 3/0644* (2013.01); *G06F 3/0604* (2013.01); *G06F 3/067* (2013.01); *G06F 9/4401* (2013.01); *G06F 16/41* (2019.01); *G06F 16/435* (2019.01); *G06F 16/48* (2019.01)

(58) Field of Classification Search
CPC ...... G06F 3/0644; G06F 3/0604; G06F 3/067; G06F 9/4401; G06F 16/41; G06F 16/435; G06F 16/48
See application file for complete search history.

(56) References Cited

U.S. PATENT DOCUMENTS

| | | | |
|---|---|---|---|
| 2008/0065875 A1* | 3/2008 | Thompson | G06F 3/0689 713/2 |
| 2018/0095667 A1* | 4/2018 | Miller | G06F 3/0604 |
| 2019/0332593 A1* | 10/2019 | Graham | G06F 11/00 |
| 2021/0149684 A1* | 5/2021 | Blagay | H04N 21/23109 |

* cited by examiner

*Primary Examiner* — Masud K Khan
(74) *Attorney, Agent, or Firm* — Workman Nydegger

(57) ABSTRACT

One example method includes moving a volume from a source server to a target server. In one example, the volume is moved and the need to copy the source data is eliminated. The volume to be moved is selected and metadata associated with the save sets stored on the volume is exported to a volume bootstrap, which is also stored on the selected volume. The volume is mounted or attached to the target server and the metadata is imported from the volume bootstrap. The volume is made read/write and is moved from the source server to the target server.

18 Claims, 4 Drawing Sheets

PROTECTED SAVESET VOLUME MOVEMENT VIA METADATA BOOTSTRAP

FIELD OF THE INVENTION

Embodiments of the present invention generally relate to data protection and data protection operations. More particularly, at least some embodiments of the invention relate to systems, hardware, software, computer-readable media, and methods for moving volumes from one server to another server.

BACKGROUND

Data protection is a fundamental aspect of computing systems today. If an entity does adequately protect their data, they are likely to experience a catastrophic event. Most entities make sure that their data and applications are protected. Over time, however, various needs arise that impact their data protection systems. For example, software and hardware continue to evolve. For these and other reasons, there is often a need to move data from one server to another server.

Once of the factors that complicates data migration is the size of the data itself. Backups, for example, may be hundreds of gigabytes or petabytes in size. In addition, metadata associated with the actual data may be gigabytes in size as well. Once of the consequences of the size is that simply scanning the data and the metadata from a source server to a target server is inefficient and cumbersome. In addition to simply moving the data, data movement is often accompanied with various types of collisions and problems that need to be resolved.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
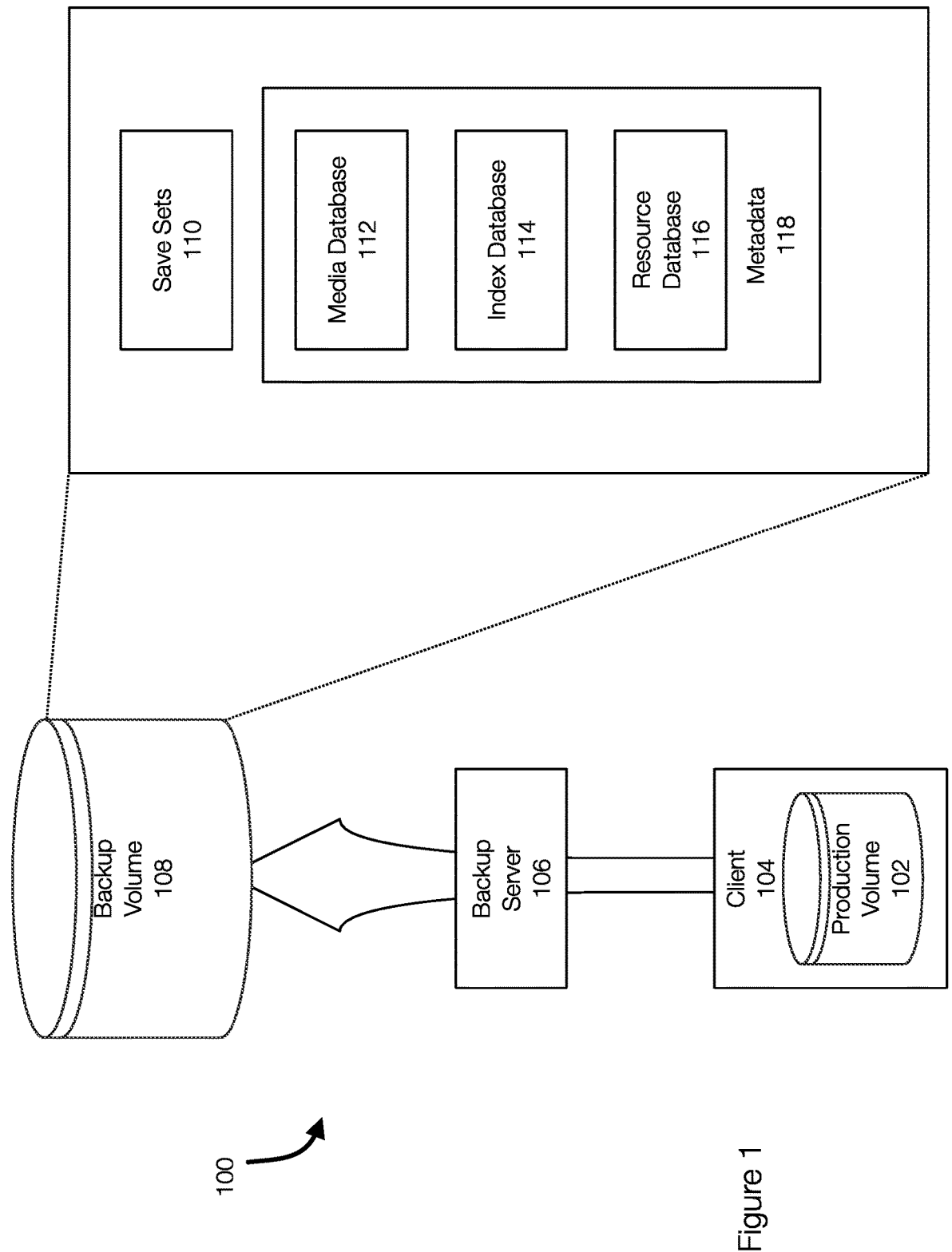
FIG. 1 discloses aspects of a data protection system.

Embodiments of the present invention generally relate to data protection operations. More particularly, at least some embodiments of the invention relate to systems, hardware, software, computer-readable media, and methods for data protection operations including volume move or migration operations.

In general, example embodiments of the invention relate to moving backups or save sets from a source server to a target server. Embodiments of the invention achieve the movement without moving or copying the save sets from the volume and without involving the replication of full images. Rather than scanning the save sets from a source and writing those save sets to a target, embodiments of the invention move the volume itself. As a result, the data sets are migrated and remain on the volume being moved. This may include, during the transition to the target server, dismounting the volume from the source server and mounting the volume to the target server. As a result, the protected save set is migrated from a source server to a target server through the volume itself.

Generally, the migration discussed herein refers to the migration of the volume itself rather than migration of just the data from one volume to a new volume. Generally, a volume is migrated by disconnected or dismounted from a source volume and connecting or mounting to a target server. Embodiments of the invention thus relate to moving or migrating a volume. In this sense, the data is also migrated at the same time without having to create an image of the volume or copy the data from the volume to another volume or location. In at least some embodiments, migration of the data refers to moving the volume itself.

Embodiments of the invention uses a volume bootstrap that is created on the volume being moved. During migration, the volume bootstrap may be a subset of data and/or metadata that allows a backup environment to be established (e.g., replicated) on or at the target server. Embodiments of the invention can migrate a protected save set of backup data between backup servers. In addition, embodiments of the invention allow a protected save set, or the volume on which the save set is stored, to migrate from one product to another different product, which is distinct from moving from one server to another server in a situation where both the source and target servers operate the same software or different versions of the same software.

Generally, the process of moving from a source server to a target server begins by identifying a volume to be moved. Feasibility checks may be initially performed with respect to the identified volume to ensure that the volume is eligible for moving.

Once the volume is identified, metadata is exported. More specifically, a self-contained volume bootstrap is created and stored on the volume being moved. The metadata is exported at the source server to the volume bootstrap. The volume bootstrap includes at least metadata. The metadata may include information related to clients of the source server and indexes and databases pertaining to the save sets on the volume being moved.

After the volume bootstrap is created and the volume is mounted on the target server, the metadata is imported at the target server from the volume bootstrap. This may include mounting the volume as read-only initially. Conflicts, if any, may be resolved before or as the metadata is imported.

The volume being moved, which is mounted to the target server, is made writable on the target server after the metadata import is completed and the volume is subsequent deleted or removed from the source server or made read only to the source server.

This allows the volume to be moved to a new server without scanning the volume, creating an image of the volume, or transferring or copying the data from one location to another location. The volume itself is moved to the new server and the metadata is configured such that the metadata can be imported at the target server.

Embodiments of the invention thus provide an export mechanism and an import mechanism that allows a volume associated with a source server to be moved to a target server.

A backup server typically generates backups, also referred to herein as save sets, and the save sets may be stored on one or more volumes. The save sets can also be cloned, migrated, or replicated. In addition, embodiments of the invention allow volumes from different data zones to be consolidated into a single data zone.

The ability to move a volume allow data protection systems to be reconfigured. For example, the ability to move a volume as disclosed herein allows multiple backup servers to be merged or combined into a single or fewer backup servers. This may reduce datacenter expenses and cost. Moving a volume from one server to another server also enables improved load balancing. The work performed by one server can be distributed to other servers.

In situations where clients or save sets become fragmented, the ability to move a volume can aid in defragmenting the clients or save sets. For example, an appliance backing up a client may become full and a second appliance that be associated with a different backup server may begin backing up the client. As a result, the client or save sets become fragmented. This results in additional management overhead because of the need to track save sets across different servers. The ability to move a volume can remove this type of fragmentation. In another example, the ability to upgrade a server is often associated with problems related to the operating system, the hardware, and the like. It may be easier to move a volume rather to a new server that can operate the upgraded software than to handle all of the issues that arise during an upgrade at the old server.

As discussed in more detail below, embodiments of the invention move volumes from source servers to target servers. In one example, every volume includes save sets and associated metadata. The metadata may include client information (e.g., to whom the backup belongs), save set information, which may include browse and retention times, save set name and size and other related information.

The client information is used to schedule the backup of a client and select the device and volume for storing the backup data. Once a save set is created, a record is created in the media database to track save set details such as path, size, flags, client identifier, retention time, browse time, and the like.

When moving a volume, this information may be needed to move the volume to a target server. Initially, this information is collected for all of the save sets on a volume selected to be moved.

Next, information about the clients whose save sets are present on the volume is collected. Indexes for those save sets are also identified. These indexes may contain a list of objects that are part of a given save set. Save set records are also identified, which may include information about save set size, retention times, and the like.

Once this information is collected, this information is packaged into a volume bootstrap and this bootstrap is stored on the volume being moved. This makes the volume self-contained, as it contains all the information on the volume itself. This ensures that volume move can be accomplished without copying any data from the source to the target.

Once a volume bootstrap is created, the same volume is presented to the target. The target server extracts metadata from the volume bootstrap and subsequently creates client resources on target serve, imports save set records into media database on the target server and copies indexes to target server.

Once clients are imported on the target server, new protection policies and workflows can be created for the imported clients and new backups can be written to moved volume. Further, if required, restores can also be done from same volume on target server.

Once the volume is moved to the target server, the volume is accessible from both the source server and the target server. Therefore, save sets are still accessible from both the target server and the source server. As a result, recover can also happen from both of the servers. In one example, the client information and the index information is not deleted from the source server. After moving the volume to the target server, this information is also added to target server. With all the required information, on both the target and source servers, recover can happen from either server. Once the moved volume on the target server is verified, the volume can remain connected to the source server as read-only. The volume could also be removed from the source server.

FIG. 1 illustrates an example of a data protection system that performs data protection operations. The data protection system 100 includes a backup server 106 that is configured to perform data protection operations such as backup operations and restore operations. The backup server 106 generally operates by backing up clients. Data protection operations, as used herein, may also include migration or volume move operations.

The backup server 106 may protect a client 104 that stores data on a production volume 102 (or volumes) by storing backups or save sets of the client on a backup volume 108 (or volumes). The client may be a physical or virtual computing device (e.g., a server (e.g., mail server, database server, file server), a storage device, a storage system, a group servers) or other device whose data can be backup up and/or recovered by the backup server 106. The production volume 102 may be associated with a production system. The backup server 106 may be associated with a data zone. The data zone may refer to all clients for which the backup server 106 provides data protection operations.

In this example, the backup server 106 generates backups of the client 104 and the backups are stored as save sets. The backup server 106 may perform data protection operations for multiple clients.

The backup volume 108 may include save sets 110 and metadata 118 for multiple clients including the client 104. The save sets 110 may each include a group of files or data or the like. Each of the clients in the data zone of the server 106 may have save sets stored in the backup volume 108.

The metadata 118 stored on the backup volume 108 may include one or more of a media database 112, an index database 114, and a resource database 116. In one example, each backup server 106 is associated with one of each of the media database 112, the index database 114, and the resource database 116.

The media database 112 may include the volume location of each save set. The media database 112 may also store and track all save set and volume life cycle information. The index database 114 may store information about each file included in the save sets 110. For example, the index database 114 may include information, for each file, such as owner, size, permissions, modifications, access times, backup timestamps, or the like or combination thereof. The resource database 116 may store information related to resources of the data protection system 100, such as clients, schedules, and backup groups, or other resources that are defined on the backup server 106.

Figure 2:
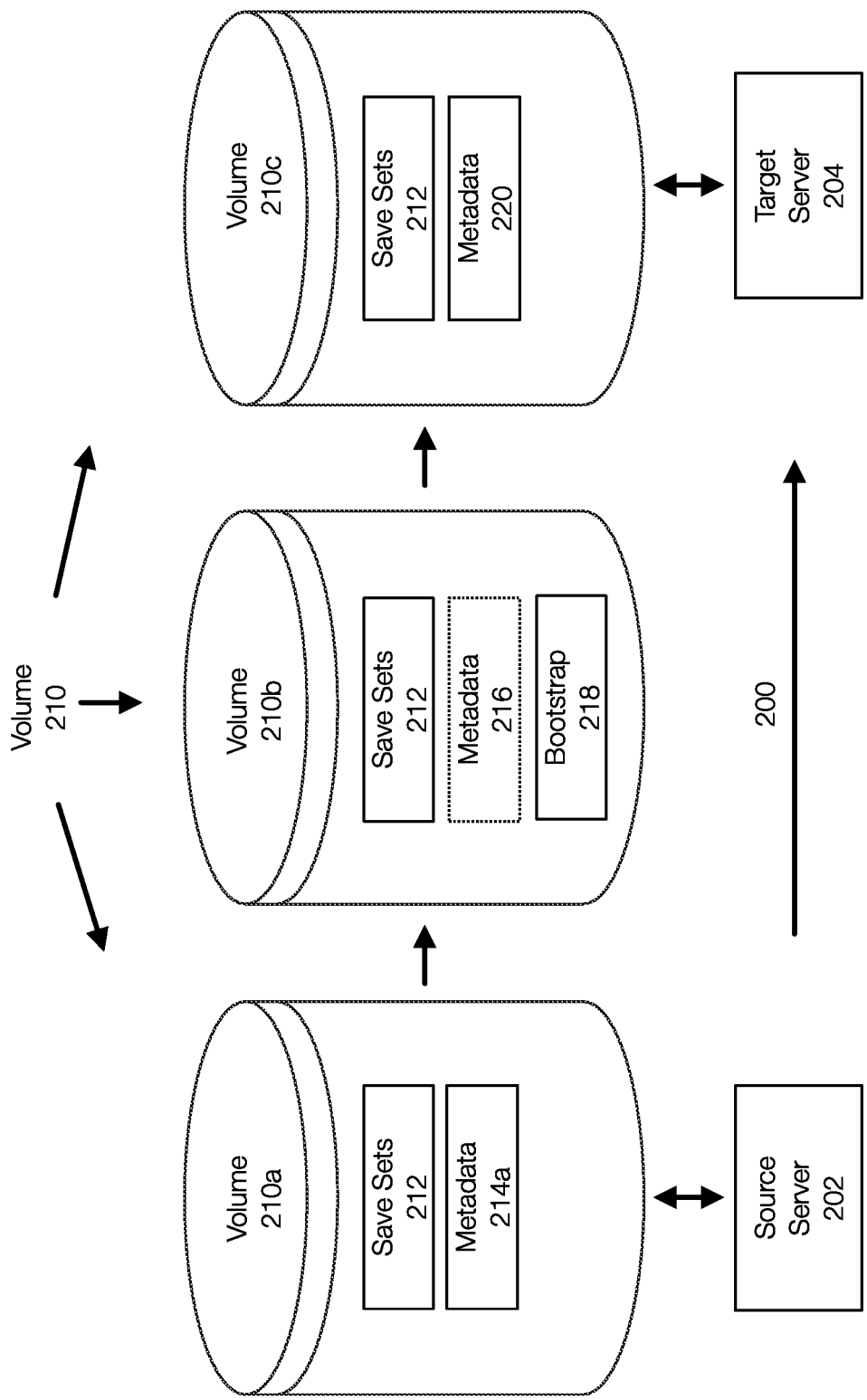
FIG. 2 discloses aspects of moving a volume from a source server to a target server by moving the volume itself.

FIG. 2 illustrates an example of migrating or moving a volume from a source server to a target server. More specifically, FIG. 2 illustrates an example a data protection system that is configured to migrate a backup volume 210 from a source server 202 to a target server 204. FIG. 2 illustrates volume 210 at different points of time or at different stages during the volume movement operation. The stages are represented by volume 210a, volume 210b, and volume 210c.

During the volume movement or migration, the save sets 212 do not change during and remain on the volume 210. Any writes to the volume 210 that occur after a migration process 200 is initiated may be migrated in an incremental migration. In one example, an incremental volume may be used for writes that occur after the migration process is performed. More specifically, save sets generated after the initial volume move may need to be moved in a similar manner. This may be referred to as an incremental volume move or migration in one example. Moving the save sets that are written to the volume after the initial move operation would further involve the generation of a new bootstrap for the new data sets.

The volume 210 is mounted to the source server 202 during normal operation and prior to migration. When the migration process 200 is initiated, the volume 210a is still mounted or attached to the source server 202 and is readable and writable.

As previously stated, the volume 210a stores save sets 212 and metadata 214a (e.g., index database, media database, resource database). In one example, the volume 210 is migrated as whole. As a result, all clients that have save sets on the volume 210 may be migrated. During the migration, a volume bootstrap 218 is created as illustrated in volume 210b. In one example, the bootstrap 218 is a save set of certain metadata. The volume bootstrap 218 may be created under a bootstrap directory created in the volume 210. A folder may be created under the bootstrap directory for each client associated with the server 202. Each client folder may include a folder for client information and an index folder. An index folder contains the index databases for the save sets corresponding to that client.

The bootstrap 218 is created by exporting at least some of the metadata 216 (e.g., the metadata 214a after export) into the bootstrap 218. In one example, metadata that can be recreated can be, but does not need to be, exported into the bootstrap 218. The bootstrap 218 includes the information necessary to rebuild or reconstitute the metadata for the save sets 212 on the volume 210. The bootstrap 218 may include media database records for the save sets 212 on the volume 210, index database records for the save sets 212, and client resources for the clients that have save sets on the volume 210. The metadata 216 may be deleted after the move is complete.

More specifically, the volume or volumes for migration are identified or selected. The save sets on the selected volume or volumes are then identified. In one example, the clients are identified from the save sets using, for example, the media database. Once the clients are identified, the indexes for the clients are identified. The relevant portions of the media database and database rows are identified and included in the metadata exported to the bootstrap 218.

In one example, the volume eligibility may be determined. In one example, spanned save sets and check pointed save sets are handled differently. The volume 210 may also have incremental save sets. If the incremental save sets are on other volumes, those volumes will be migrated in a similar manner. In addition, applications may have save sets, required for recovery, in multiple volumes. These volumes should be identified and migrated as well.

When generating the bootstrap 218, a save set or backup of the bootstrap 218 may also be generated.

Once the bootstrap 218 is prepared, the volume 210 is mounted to the target server 204 as shown by volume 210c. Initially, the volume 210c is mounted as read only. The metadata 216 is then read from the volume 210 and imported into the metadata 220. In one example, importing the metadata may include creating the client resources for each of the clients using the client resources included in the bootstrap. Index files, if present in the bootstrap 218, are also copied into the indexes of the metadata 220. Database records from the media database are merged into or added to any existing media database at the target server. In some examples, at least some of the metadata 220, such as indexes, can be rebuilt at the target server if necessary or desired.

When importing the metadata 216 to the metadata 220 or before importing the metadata 216 to the metadata 220, conflicts (e.g., client conflicts) are analyzed. For example, a client may exist at different backup servers. If two clients are the are the same, this is a conflict that should be resolved. The conflict analysis compares the host names, whether one of the host name matches any of the aliases on either the source or target server, and the save set names. If a collision or conflict is determined, the source client or the target client is kept. Clients that have the same hostname or a match in aliases, but different save set names, are considered to be different clients.

After the metadata 220 is completed, the volume 210c is made readable and writeable at the target server 204. The volume 210 is also removed from the source server 202 and deleted from the data zone of the source server 202. The volume 210 may alternatively be made read only to the source server 202.

Figure 3:
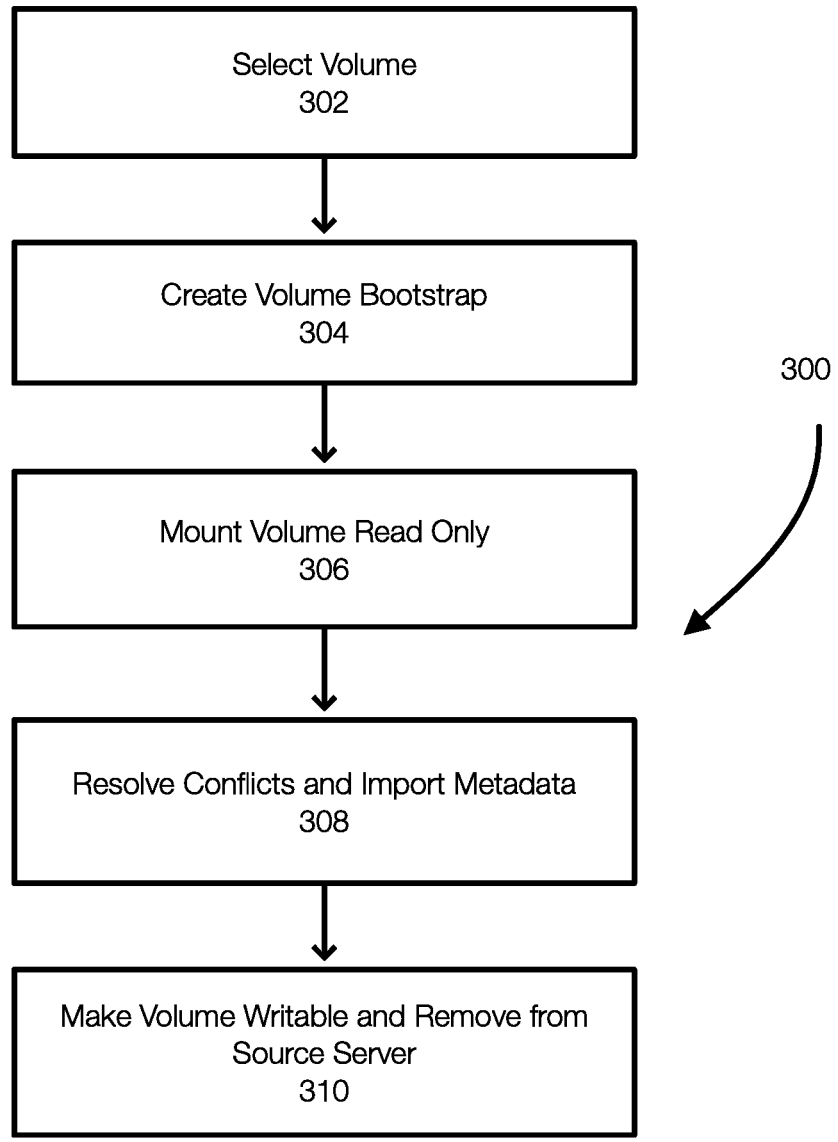
FIG. 3 discloses aspects of a method for moving a volume from a source server to a target server.

FIG. 3 illustrates an example of a method for moving a volume from a source server to a target server. The method 300 may begin by selecting 302 a volume. When a volume is selected, the volume may be checked for eligibility to ensure that the volume can be moved as there may be reasons to prevent the volume from being migrated. For example, spanned save sets may be moved or migrated in a different manner.

After selecting the volume, a volume bootstrap is created 304. The volume bootstrap may include metadata at least for clients associated with the save sets on the volume. The metadata is exported from the volume into the volume bootstrap, which is stored on the volume being migrated.

Next, the volume is mounted 306 as read only on the target server. Conflicts are resolved and the volume bootstrap, including the metadata stored therein, is imported 308 to the target server. This may include adding the save set identifiers to the media database, adding the resources to the resource database, and adding indexes to the index records or database. Once the import is completed, the volume is made 310 writable at the target server and removed from or made read only to the source server.

The process for migrating an incremental volume is similar. In this case, for example, a save set may be created after the initial migration of a volume or while the volume is being moved. The process for moving the incremental volume is similar except that it applies to the incremental volume. Thus, the incremental bootstrap is created in the same manner (e.g., by exporting the relevant metadata). The metadata in the incremental bootstrap is then imported at the target server. The incremental volume is mounted at the target volume, made writable, added to the target data zone and removed from the source server and the source data zone.

As previously stated, moving a volume requires a bootstrap to be generated for the volume being moved. The bootstrap may include at least portions of the resource database, index record, and media database. In one example, the indexes may not be included in the bootstrap due to size and because the indexes can be rebuilt at the target server.

Figure 4:
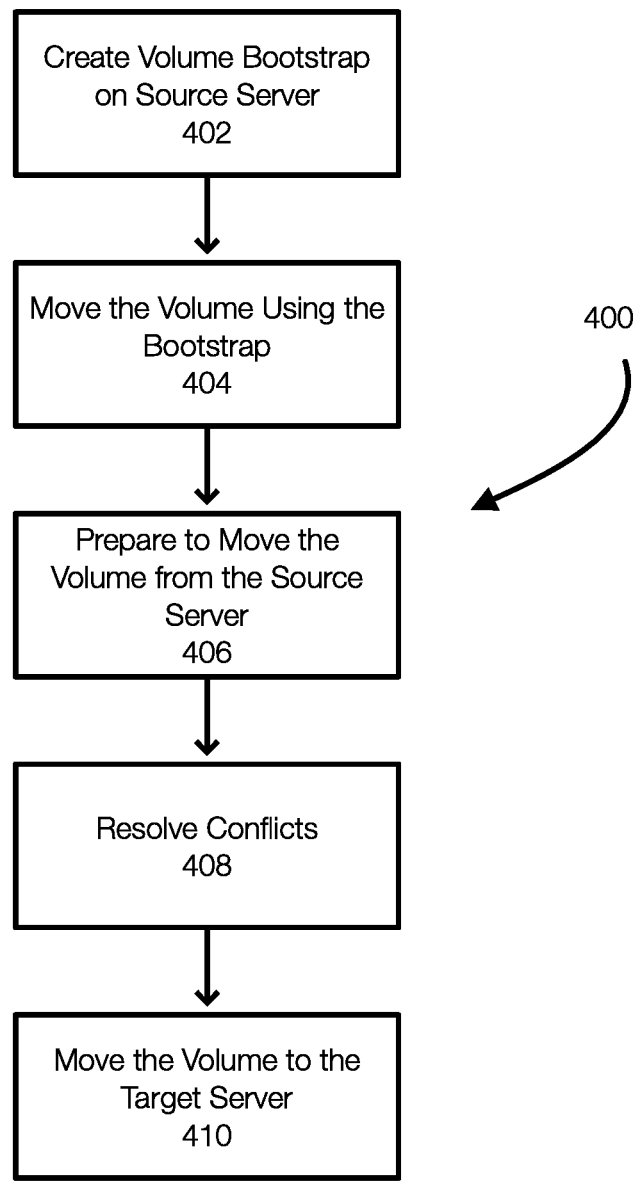
FIG. 4 discloses aspects of a method for moving a volume from a source server to a target server.

FIG. 4 illustrates another example of moving a volume from a source server or source data zone to a target server or target data zone. The elements of the method 400 may be performed in different orders and some of the elements may be performed simultaneously. The elements of FIG. 4 are disclosed by way of example only and not limitation.

Generally, a volume bootstrap is created 402 at the source server after selecting a volume. The volume bootstrap is created by creating a directory structure that will be used to store the metadata exported from the metadata of the selected volume. Because a volume may store multiple save sets, the folder may be created based on a current timestamp or whenever the volume metadata is exported. For example, a folder may be created in the directory structure for each client and each client folder may store client information, indexes for the client's save sets, and media information.

In one example, a volume bootstrap save set for the metadata of the moving volume is created. The backup is stored on the volume being migrated. When the backup is run, the SSID of the save set may be determined.

The volume is moved 404 using the volume bootstrap. First, the volume is made read only and connected to the target volume. The volume bootstrap is recovered (e.g., when saved as a save set) to extract the metadata. Thus, the volume is moved by importing the metadata at the target server. In one example, data zone move or consolidation may be performed on a volume basis.

When moving a volume, all the metadata required to access the save sets on the volume being moved need to be moved to the target server. In one example, the volume can be moved by exporting the metadata related to the moving volume at the source server, analyze for client conflicts on the target server, and import the metadata of the move volume at the target server.

More specifically, moving the volume begins by preparing 406 to move the volume from the source server. In one example, a user may enter a command to start collecting the information needed to move the volume. This may include identifying or selecting the volume to be moved (e.g., based on volume ID). The save sets residing on the selected volume are identified. A database query to the media database may identify all of the save sets stored on the volume. From the save sets identified from the query to the media database, all clients associated with the save sets can also be identified. Using the resource database, all of the resources for the identified clients can be retrieved from the resource database. Next, all of the indexes for the save sets of clients located on the on the volume are identified. When identifying the indexes, a start time from the media database may be used to identify the indexes for the save sets of the clients located on the volume. Next database rows from the media database that need to be inserted into the media database at the target are identified. Identify Media DB "vol" and "ss" database rows, which needs to be inserted into target server Media DB.

Once the metadata has been exported to the volume bootstrap and the volume is prepared for movement, the volume may be attached to the target server and conflicts are resolved 408. A client can exist in multiple servers, but is active in only one server. As a result, the same client may exist on both the source and target servers. If two clients are the same on both the source and the target server, the following attributes may be compared or evaluated: host name, save sets, and whether one of the host names matches an alias of either server. If there is a collision, the source client may be kept or the target client may be kept. In the former case, the target server client resource is deleted and source server client resource is added. In the latter case, nothing is modified and source server client resource is discarded. Clients having same the same host name or a match in aliases, but having different save set name, are considered to be different clients and have different client resources. With regard to the indexes, it may be useful to group the metadata per client to aid with conflict resolution.

The volume is then moved 410 to the target server. Once conflicts or collisions are removed, a read only device is created using the volume access path of the volume being moved or migrated. A copy of the index folders may be made for rollback. The metadata in the volume bootstrap, located on the migrating volume or the volume being moved, is extracted to the target server and all of the client resources, which are in the volume bootstrap, are created. The index files are copied to the target server and the media database record for the clients, save sets, and volume in the volume bootstrap are copied into the media database of the target server. Some of the attributes may be added to the target server. This may include the date of import, the original server, client ID and resource ID.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/ or cause the implementation of, data movement operations. Such operations may include, but are not limited to, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted with respect to the example methods herein that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in any way.

Embodiment 1

A method, comprising: selecting a volume attached to a source server to move from the source server to a target server, creating a volume bootstrap on the selected volume, exporting metadata associated with save sets stored on the selected volume into the volume bootstrap, wherein the volume bootstrap is stored on the selected volume, mounting the volume as read only to the target server, importing the metadata in the volume bootstrap to the target server such that the volume is moved to the target server without copying the data from the volume.

Embodiment 2

The method of embodiment 1, further comprising exporting metadata including at least portions of a media database, index records, and a resource database into the volume bootstrap.

Embodiment 3

The method of embodiment 1 and/or 2, wherein the exported metadata includes all metadata relevant to save sets stored on the selected volume.

Embodiment 4

The method of embodiment 1, 2, and/or 3, further comprising making the selected volume writable and readable to the target server and removing the selected volume from a data zone of the source server.

Embodiment 5

The method of embodiment 1, 2, 3, and/or 4, further comprising resolving conflicts relates to clients in the metadata and clients of the target server.

Embodiment 6

The method of embodiment 1, 2, 3, 4, and/or 5, wherein conflicts are identified based on a host name, save set names, and whether a host name matches an alias of the source server or the target server.

Embodiment 7

The method of embodiment 1, 2, 3, 4, 5, and/or 6, further comprising identifying the save sets from a media database and identifying clients from the save sets.

Embodiment 8

The method of embodiment 1, 2, 3, 4, 5, 6, and/or 7, further comprising ensuring that all volumes associated with a client are moved to the target server.

Embodiment 9

The method of embodiment 1, 2, 3, 4, 5, 6, 7, and/or 8, further comprising moving an incremental volume to the target server.

Embodiment 10

The method of embodiment 1, 2, 3, 4, 5, 6, 7, 8, and/or 9, further comprising retrieving the metadata from the selected volume.

Embodiment 11

A method for performing any of the operations, methods, or processes, or any portion of any of these, disclosed herein.

Embodiment 12

A non-transitory storage medium having stored therein instructions that are executable by one or more hardware processors to perform operations comprising the operations of any one or more of embodiments 1 through 11.

Embodiment 13

A server or other device configured to perform or implement any of the embodiments or portions thereof disclosed therein including any one or more of or portion thereof of embodiments 1-12.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device. As well, where any of the aforementioned elements comprise or consist of a virtual machine (VM), that VM may constitute a virtualization of any combination of the physical components disclosed herein.

In one example, the physical computing device includes a memory which may include one, some, or all, of random access memory (RAM), non-volatile memory (NVM) such as NVRAM for example, read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   selecting a volume attached to a source server to move from the source server to a target server;
   creating a volume bootstrap on the selected volume;
   exporting metadata associated with save sets stored on the selected volume into the volume bootstrap, wherein the volume bootstrap is stored on the selected volume;
   mounting the volume as read only to the target server;
   importing the metadata in the volume bootstrap to the target server such that the volume is moved to the target server without copying the data from the volume; and
   resolving conflicts related to clients in the metadata and clients of the target server.

2. The method of claim 1, further comprising exporting metadata including at least portions of a media database, index records, and a resource database into the volume bootstrap.

3. The method of claim 2, wherein the exported metadata includes all metadata relevant to save sets stored on the selected volume.

4. The method of claim 1, further comprising making the selected volume writable and readable to the target server and removing the selected volume from a data zone of the source server.

5. The method of claim 1, wherein conflicts are identified based on a host name, save set names, and whether a host name matches an alias of the source server or the target server.

6. The method of claim 1, further comprising identifying the save sets from a media database and identifying clients from the save sets.

7. The method of claim 1, further comprising ensuring that all volumes associated with a client are moved to the target server.

8. The method of claim 1, further comprising moving an incremental volume to the target server.

9. The method of claim 1, further comprising retrieving the metadata from the selected volume.

10. A non-transitory storage medium having stored therein instructions that are executable by one or more hardware processors to perform operations comprising:
    selecting a volume attached to a source server to move from the source server to a target server;
    creating a volume bootstrap on the selected volume;
    exporting metadata associated with save sets stored on the selected volume into the volume bootstrap, wherein the volume bootstrap is stored on the selected volume;
    mounting the volume as read only to the target server;
    importing the metadata in the volume bootstrap to the target server such that the volume is moved to the target server without copying the data from the volume; and
    resolving conflicts related to clients in the metadata and clients of the target server.

11. The non-transitory storage medium of claim 10, further comprising exporting metadata including at least portions of a media database, index records, and a resource database into the volume bootstrap.

12. The non-transitory storage medium of claim 11, wherein the exported metadata includes all metadata relevant to save sets stored on the selected volume.

13. The non-transitory storage medium of claim 10, further comprising making the selected volume writable and readable to the target server and removing the selected volume from a data zone of the source server.

14. The non-transitory storage medium of claim 10, wherein conflicts are identified based on a host name, save set names, and whether a host name matches an alias of the source server or the target server.

15. The non-transitory storage medium of claim 10, further comprising identifying the save sets from a media database and identifying clients from the save sets.

16. The non-transitory storage medium of claim 10, further comprising ensuring that all volumes associated with a client are moved to the target server.

17. The non-transitory storage medium of claim 10, further comprising moving an incremental volume to the target server.

18. The non-transitory storage medium of claim 10, further comprising retrieving the metadata from the selected volume.

* * * * *